US007882121B2

(12) United States Patent
Bruno et al.

(10) Patent No.: US 7,882,121 B2
(45) Date of Patent: Feb. 1, 2011

(54) GENERATING QUERIES USING CARDINALITY CONSTRAINTS

(75) Inventors: Nicolas Bruno, Redmond, WA (US); Surajit Chaudhuri, Redmond, WA (US); Dilys Thomas, Stanford, CA (US)

(73) Assignee: Microsoft Corporation, Redmond, WA (US)

( * ) Notice: Subject to any disclaimer, the term of this patent is extended or adjusted under 35 U.S.C. 154(b) by 272 days.

(21) Appl. No.: 11/275,782

(22) Filed: Jan. 27, 2006

(65) Prior Publication Data

US 2007/0185851 A1    Aug. 9, 2007

(51) Int. Cl.
*G06F 17/00*    (2006.01)
(52) U.S. Cl. .................. 707/759; 707/766; 707/779; 707/780; 707/690; 707/700
(58) Field of Classification Search .............. 707/4, 707/2, 690, 700, 759, 766, 779, 780
See application file for complete search history.

(56) References Cited

U.S. PATENT DOCUMENTS

| 5,664,173 | A |   | 9/1997  | Fast        |       |
|-----------|---|---|---------|-------------|-------|
| 5,675,779 | A | * | 10/1997 | Doktor      | 707/4 |
| 5,701,471 | A |   | 12/1997 | Subramanyam |       |
| 5,761,653 | A | * | 6/1998  | Schiefer et al. | 707/2 |
| 5,819,255 | A | * | 10/1998 | Celis et al. | 707/2 |
| 5,822,747 | A | * | 10/1998 | Graefe et al. | 707/2 |
| 5,956,706 | A | * | 9/1999  | Carey et al. | 707/2 |
| 6,052,694 | A |   | 4/2000  | Bromberg    |       |
| 6,138,111 | A | * | 10/2000 | Krishna     | 707/2 |
| 6,138,112 | A |   | 10/2000 | Slutz       |       |
| 6,145,121 | A |   | 11/2000 | Levy et al. |       |
| 6,356,889 | B1 | * | 3/2002  | Lohman et al. | 707/2 |
| 6,393,435 | B1 |   | 5/2002  | Gartner et al. |   |
| 6,581,052 | B1 |   | 6/2003  | Slutz       |       |
| 6,732,110 | B2 | * | 5/2004  | Rjaibi et al. | 707/2 |
| 6,738,755 | B1 | * | 5/2004  | Freytag et al. | 707/2 |
| 6,760,720 | B1 | * | 7/2004  | De Bellis   | 707/3 |
| RE40,063  | E  | * | 2/2008  | Doktor      | 1/1   |
| 2002/0069193 | A1 | * | 6/2002 | Beavin et al. | 707/2 |

(Continued)

OTHER PUBLICATIONS

Michael J. Carey, On saying "Enough already!" in SQL, Jun. 1997, ACM, vol. 26, Issue 2, http://doi.acm.org/10.1145/253262.253302.*

(Continued)

*Primary Examiner*—Charles Rones
*Assistant Examiner*—Kurt Mueller
(74) *Attorney, Agent, or Firm*—L. Alan Collins; Collins & Collins Incorporated

(57) ABSTRACT

A query generation using cardinality constraints process including choosing a first set of parameters for a query, calculating an additional set of parameters based on the first set of parameters, executing the query using additional set of parameters, evaluating the cardinality error the additional set of parameters, and refining the additional set of parameters to meet the desired cardinality constraint. Creating a query and selecting parameters for the query to meet a desired cardinality constraint or set of cardinality constraints when the query is executed against a database may be difficult. A query generation using cardinality constraints process may create a set of parameters for a query which satisfies a desired cardinality constraint or set of cardinality constraints. An application of such a query generation using cardinality constraints process may be database component and code testing.

20 Claims, 4 Drawing Sheets

U.S. PATENT DOCUMENTS

| | | | |
|---|---|---|---|
| 2004/0128287 A1* | 7/2004 | Keller et al. | 707/3 |
| 2004/0181521 A1* | 9/2004 | Simmen | 707/3 |
| 2004/0236722 A1* | 11/2004 | Waas et al. | 707/2 |
| 2005/0004907 A1* | 1/2005 | Bruno et al. | 707/4 |
| 2005/0097078 A1* | 5/2005 | Lohman et al. | 707/2 |
| 2005/0097118 A1 | 5/2005 | Slutz | |
| 2005/0120000 A1* | 6/2005 | Ziauddin et al. | 707/3 |
| 2005/0125427 A1* | 6/2005 | Dageville et al. | 707/100 |
| 2005/0210010 A1* | 9/2005 | Larson et al. | 707/3 |
| 2006/0026133 A1* | 2/2006 | Ahmed | 707/3 |
| 2006/0074875 A1* | 4/2006 | Faunce et al. | 707/3 |
| 2006/0106777 A1* | 5/2006 | Faunce et al. | 707/3 |
| 2006/0149744 A1* | 7/2006 | Das et al. | 707/10 |
| 2006/0235818 A1* | 10/2006 | Muras | 707/1 |
| 2007/0022136 A1* | 1/2007 | Keller et al. | 707/102 |
| 2007/0038618 A1* | 2/2007 | Kosciusko et al. | 707/4 |
| 2007/0226178 A1* | 9/2007 | Ewen et al. | 707/2 |
| 2007/0233634 A1* | 10/2007 | Corvinelli et al. | 707/1 |
| 2008/0052286 A1* | 2/2008 | Faunce et al. | 707/5 |
| 2008/0086444 A1* | 4/2008 | Yu et al. | 707/2 |
| 2009/0012977 A1* | 1/2009 | Corvinelli et al. | 707/100 |
| 2009/0077054 A1* | 3/2009 | Muras et al. | 707/5 |

OTHER PUBLICATIONS

Firstsql.com, SQL Tutorial, 2005, from http://www.firstsql.com/tutor2.htm (retrieved Jun. 2, 2008).*

Ingres.com, Predicates in SQL, from http://docs.ingres.com/sqlref/PredicatesinSQL (retrieved Jun. 2, 2008).*

Chemaxon.com, Structure Searcing, from http://www.chemaxon.com/jchem/doc/guide/search/index.html (retrieved Jun. 4, 2008).*

Alice Rischert, Writing Better SQL Using Regular Expressions, Aug. 2003, Oracle Technology Network, from http://web.archive.org/web/20040220134041/http://www.quest-pipelines.com/newsletter-v5/0204_A.htm (a version of the publication dated Feb. 20, 2004) (retrieved Jun. 4, 2008).*

Nicolas Bruno et al. "Generating Queries with Cardinality Constraints for DBMS Testing", IEEE Transactions on Knowledge and Data Engineering, Dec. 2006, vol. 18, issue 12.

M.Y. Chan et al. "Testing Database Applications with SQL Semantics", Proceedings of 2nd International Symposium on Cooperative Database Systems for Advanced Applications (CODAS'99), Mar. 1999, pp. 363-374.

Yuetang Deng et al. "Testing Database Transaction Consistency", Polytechnic University, Department of Computer and Information Science, Technical Report TRC-IS-2003-04, Oct. 20, 2003.

David Chays et al. "An Agenda for testing relational database applications" Software Testing, Verification and Reliability, published online Jan. 20, 2004, vol. 14, issue 1, pp. 17-44, Copyright 2004 John Wiley and Sons, Ltd.

* cited by examiner

GENERATING QUERIES USING CARDINALITY CONSTRAINTS

BACKGROUND

A database application may include multiple software components designed to perform multiple types of functionality. Testing specific software components and specific functionality of the software components typically involves populating a test database with test data and then using random queries in a trial-and-error fashion until results suitable for testing the software component are obtained.

SUMMARY

Using cardinality constraints to generate queries may produce a set of parameters for one or more pattern queries that are able to return a desired number of results with a desired set of data relationships from a database. The set of parameters may then be used in conjunction with the pattern query to test at least portions of software components associated with a database application.

DESCRIPTION OF THE DRAWINGS

The present invention will be described in accordance with the following figures.

DETAILED DESCRIPTION

The detailed description provided below in connection with the appended drawings is intended as a description of the present examples and is not intended to represent the only forms for generating queries using cardinality constraints. The description sets forth the functions of the example and the sequence of steps for constructing and operating the example. However, the same or equivalent functions and sequences may be accomplished by different examples.

Query generation using cardinality constraints services are described herein. More particularly, the description herein pertains to services, methods, programs, and other implementations for query generation using cardinality constraints which may be stored on a computer network.

Testing individual areas of functionality corresponding to database applications such as Microsoft SQL Server™, Oracle Database, or mySQL® may typically be accomplished by populating an instance of the database with test data and performing a number of queries or a single query including a number of sub-expressions.

For example, it may be desirable to test the impact of a new memory management component for a database application under certain operating conditions. The certain operating conditions may only be exhibited when a query performing a particular operation or set of operations returns a data set of a certain size. An example of such a particular operation may join two or more tables. The size of the returned data set may be known as a cardinality.

A developer of a database wishing to test the database may therefore determine a desired set of database operations and/or a desired cardinality. That is, the database developer may select a parametric pattern query which may include a particular operation or a particular set of operations, and may place cardinality constraints upon the pattern query. A parametric pattern query is typically a type of query in which one or more parameters are included to restrict the range of data which may be selected by the query. For example, a parametric pattern query including a SQL SELECT operation may be:

$$\text{SELECT*FROM } A_1 \text{ WHERE } x<=A_1.\text{column}_1$$

where $A_1$ is the name of a table in the database, $A_1.\text{column}_1$ represents the values stored in a row under $\text{column}_1$ in table $A_1$, and x is a parameter for which values may be substituted to restrict the data selected from $\text{column}_1$. The terms "pattern query" and "parametric pattern query" may be used interchangeably.

Generating parameters for pattern queries that return a set of data exhibiting characteristics necessary to test a specific area of functionality within the database application may be difficult. For instance, an error-prone and time-consuming trial-and-error approach may be used when selecting parameters, however, such an approach may not produce optimal results and in some cases may not produce acceptable results at all.

Figure 1:
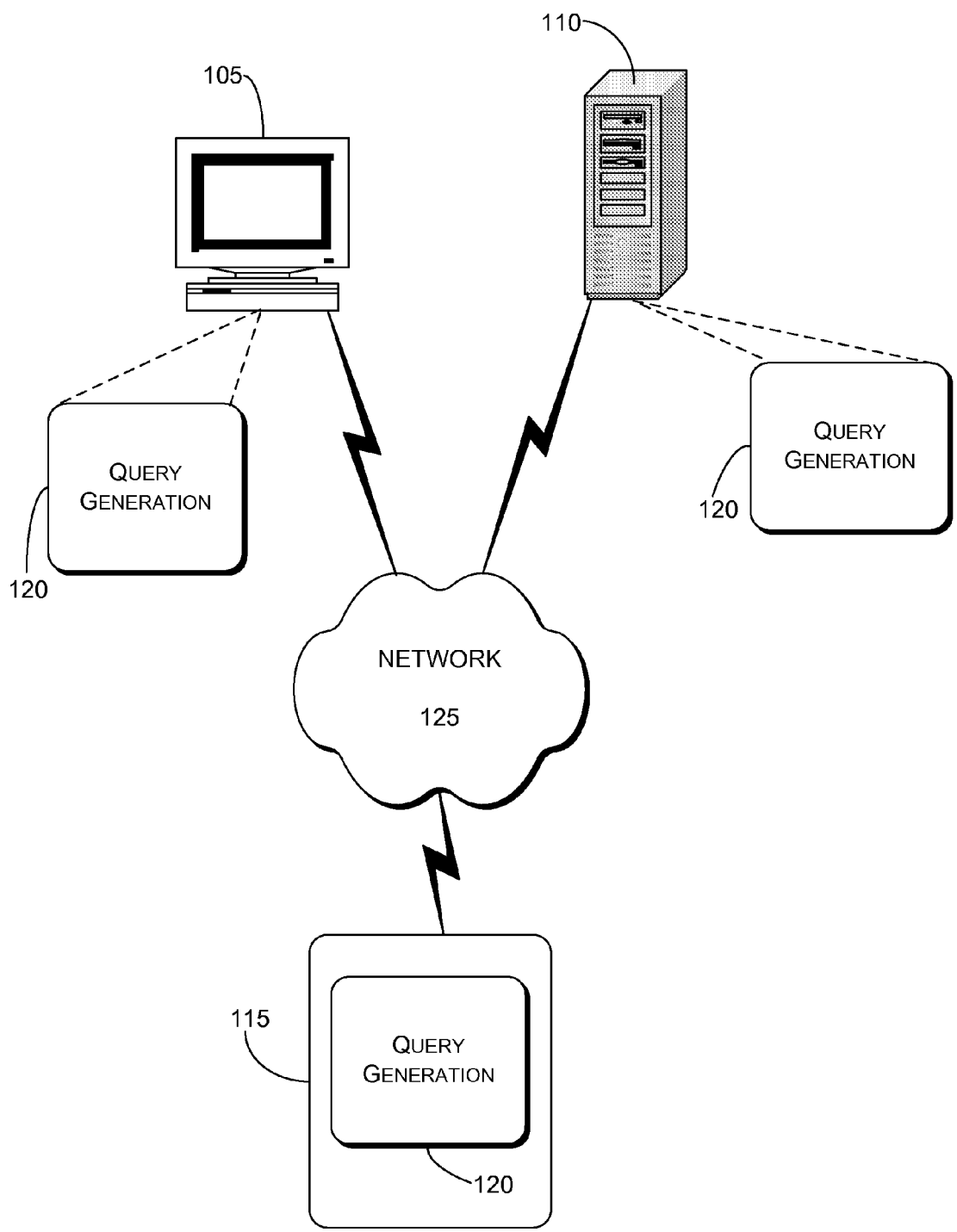
FIG. 1 shows devices communicating over a network, with the devices implementing example technologies for query generation using cardinality constraints.

FIG. 1 shows example network environment 125 in which examples of query generation using cardinality constraints services may be implemented, although the examples of query generation using cardinality constraints services are not necessarily limited to network environments. Regardless, in FIG. 1, the client device 105, server device 110, and "other" device 115 may be communicatively coupled to one another via a network 125; and, further, at least one of the client device 105, server device 110, and "other" device 115 may be capable of implementing query generation using cardinality constraints services 120, as described herein.

The client device 105 may be at least one of a variety of conventional computing devices, including a desktop personal computer (PC), workstation, mainframe computer, Internet appliance, set-top box, and gaming console. Further, the client device 105 may be at least one of any device that is capable of being associated with the network 125 by a wired and/or wireless link, including a personal digital assistant (PDA), laptop computer, cellular telephone, etc. Further still, the client device 105 may represent the client devices described above in various quantities and/or combinations thereof. The "other" device 115 may also be embodied by any of the above examples of the client device 105.

The server device 110 may provide any of a variety of data and/or functionality to the client device 105 or the "other" device 115 in accordance with at least one implementation of query generation using cardinality constraints 120. The data may be publicly available or alternatively restricted, e.g., restricted to only certain users or only if an appropriate subscription or licensing fee is paid. The server device 110 may be at least one of a network server, an application server, a blade server, or any combination thereof. Typically, the server device 110 is any device that may be a content source, and the client device 105 is any device that may receive such content either via the network 125 or in an off-line manner. However, according to the example implementations described herein, the client device 105 and the server device 110 may interchangeably be a sending node or a receiving node in the network environment 100. The "other" device 115 may also be embodied by any of the above examples of the server device 110.

The "other" device 115 may be any further device that is capable of implementing query generation using cardinality constraints services 120 according to one or more of the examples described herein. That is, the "other" device 115 may be any software-enabled computing or processing device that is capable of implementing query generation using cardinality constraints services 120 for an application, program, function, or other assemblage of programmable and executable code. Thus, "other" device 115 may be a computing or processing device having at least one of an operating system, an interpreter, converter, compiler, or runtime execution environment implemented thereon. These examples are not intended to be limiting in any way, and therefore should not be construed in such manner.

The network 125 may represent any of a variety of conventional network topologies and types, which may include wired and/or wireless networks. The network 125 may further utilize any of a variety of conventional network protocols, including public and/or proprietary protocols. The network 125 may include, for example, the Internet as well at least portions of one or more local area networks (also referred to, individually, as a "LAN"), such as an 802.11 system; a personal area network (i.e., PAN), such as Bluetooth.

Computer architecture in at least one of devices 105, 110, and 115 has typically defined computing platforms in terms of hardware and software. Software for computing devices came to be categorized into groups, based on function, which may include: a hardware abstraction layer (alternatively referred to as a "HAL"), an operating system (alternatively referred to as "OS"), and applications.

The operating system may serve as at least an application execution platform and may implement such code reuse techniques as a component object model (COM). The operating system may execute applications either on demand in response to interaction from a user of the operating system or automatically based on at least a startup parameter of the operating system. For example, the operating system may implement a persistent store of application preferences and settings which may be a registry. The persistent store, or registry, may be queried by the operating system to determine which applications should be automatically executed upon startup.

Figure 2:
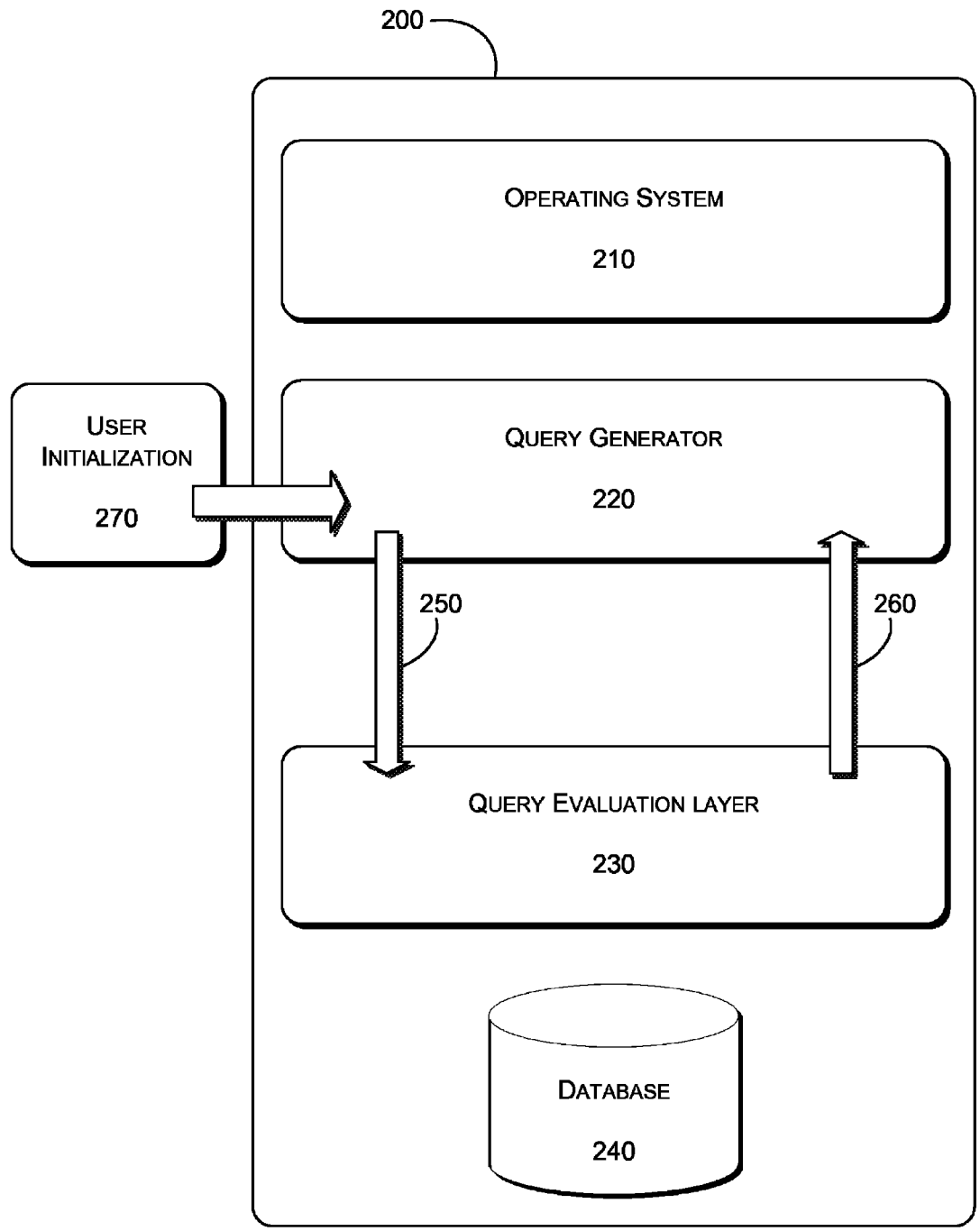
FIG. 2 shows an example of an execution environment for implementing example technologies for query generation using cardinality constraints.

FIG. 2 shows an example execution environment 200 in which examples of query generation using cardinality constraints services 120 (see FIG. 1) may be implemented.

Figure 3:
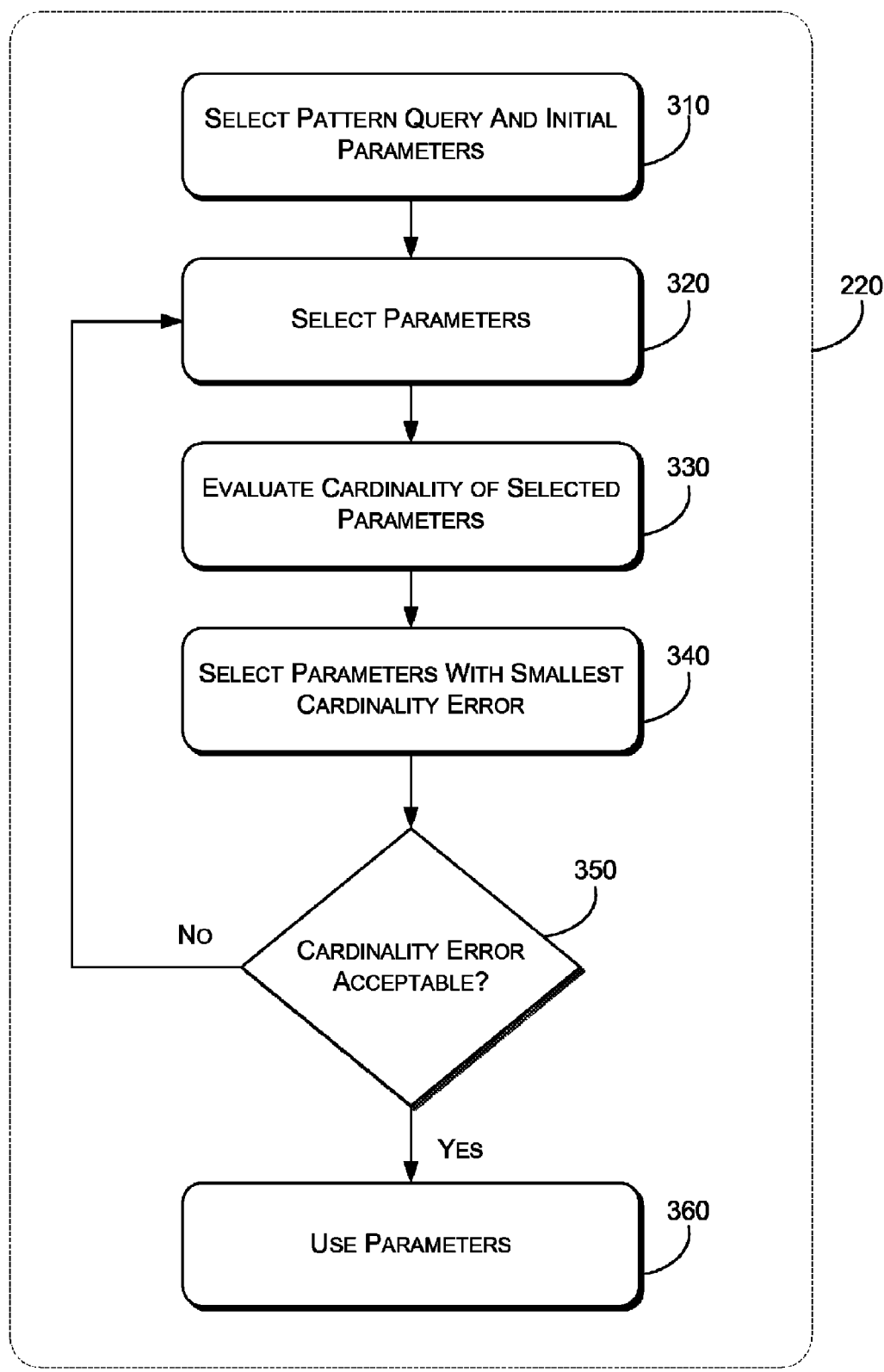
FIG. 3 shows an example processing flow in accordance with an example implementation of query generation using cardinality constraints.
Figure 4:
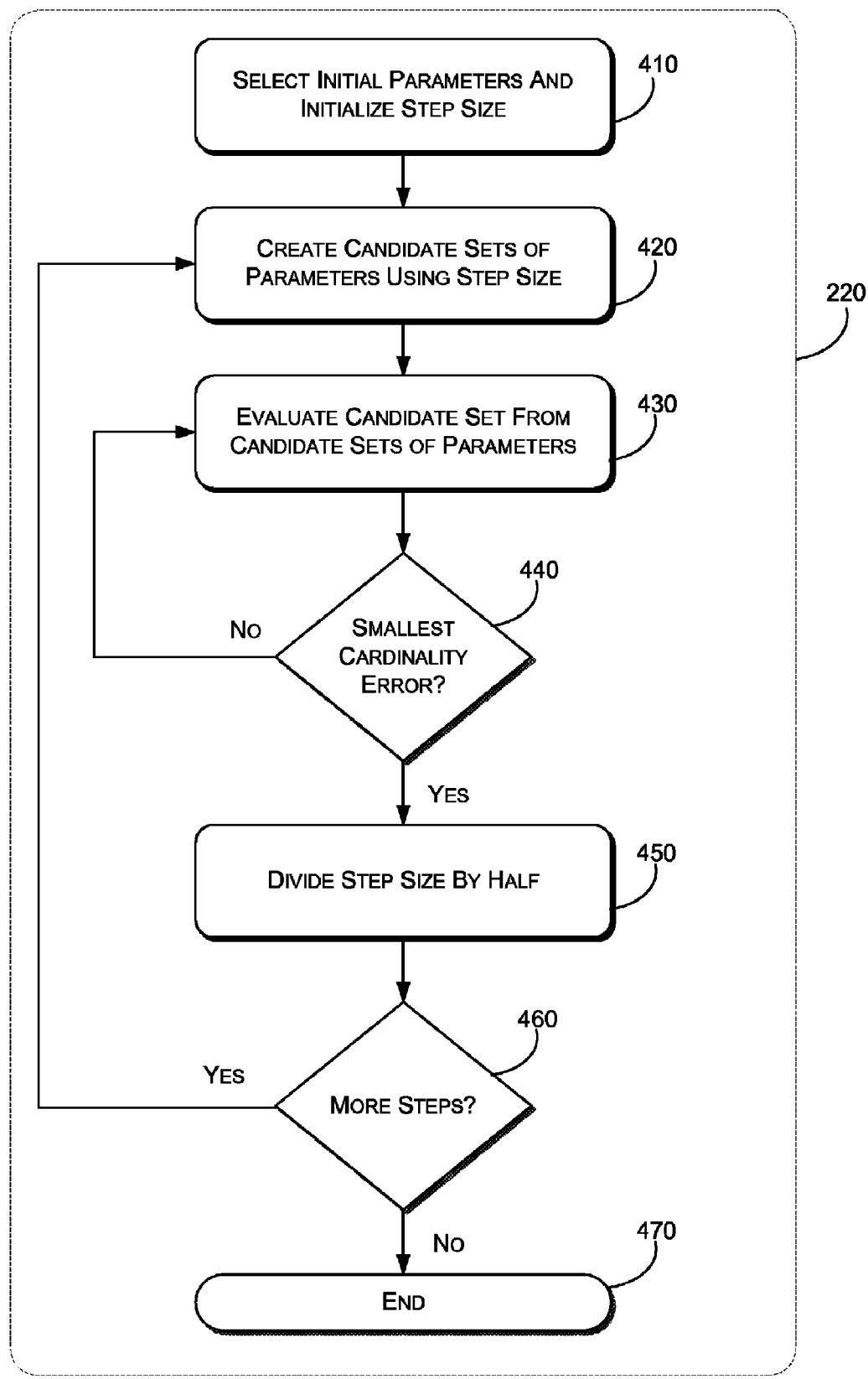
FIG. 4 shows an example processing flow in accordance with an example implementation of query generation using cardinality constraints.

In the description of the modules of FIG. 2, which may also be referred to by the descriptions of FIGS. 3 and 4, various operations may be described as being performed by different modules of the execution environment 200. The operations that are described with respect to a particular module may be carried out by the particular module itself, by the particular module in cooperation with the example operating system 210, or by the particular module in cooperation with at least one other module corresponding to the execution environment 200. Thus, the descriptions relate to example implementations, and are not intended to be limiting in any manner.

The execution environment 200 may execute the example operating system 210. The example operating system 210 may implement the following: input/output (hereafter "I/O") routine management, component object model (COM, COM+) services, distributed component object model (DCOM) services, network communication services, world wide web services, memory management, or application execution. The example operating system 210 may make use of component object model services, distributed component object model services, and world wide web services to execute specific tasks on at least one of processing device 105, 110, or 115. More particularly, component object model services may provide a consistent interface to allow the dynamic instantiation of software components stored on at least one of processing devices 105, 110, and 115 implementing the component object model interface. Component object model services may also provide bindings for at least one development language, for example C, C++, or Visual Basic, such that these development languages may be used to reference the instantiated component regardless of the development language used to originally create the software component. Further, distributed component object model services and world wide web services may provide functionality to allow the instantiation and execution of application modules or components remotely located on at least one of processing devices 105, 110, or 115 over the network 125.

Thus, execution environment 200 may include, at least, a query generator 220, a query evaluation layer 230, and a database 240 in conjunction with the example operating system 210. The execution environment 200 may also provide an interface to allow user initialization 270 of query generator 220.

User initialization 270 may include functionality to allow a user of query generator 220 to specify an initial parametric pattern query, an initial set of parameters for the parametric pattern query, and an acceptable or desirable cardinality. A user may have determined an acceptable or desirable cardinality using any method.

These modules are to be described in further detail below, and are provided only as examples, and may be implemented in examples of execution environment 200 in various combinations and configurations thereof. The examples are not intended to be limiting to any particular implementation of a particular execution environment, and no such inference should be made.

The query generator 220 may be a software component which may execute in conjunction with the example operating system 210. The query generator 220 may make use of I/O, component object model services, distributed component object model services, or world wide web services of the example operating system 210 to generate an instance of a database query using a selected set of parameters and may then submit the query instance 250 to the query evaluation layer 230. The query generator 220 may also make use of I/O, component object model services, distributed component object model services, world wide web services, network communication services, or a user interface to accept information related to user initialization 270.

The query generator 220 may implement one or more refinement models to produce a set of parameters for a pattern query that returns a desired cardinality constraint. Such refinement model will be discussed with respect to FIG. 3 and FIG. 4, but the refinement model which may be implemented by the query generator 220 is not limited to either of these examples. Other types of refinement models which produce a set of parameters for a pattern query that returns a desired cardinality constraint may be equivalently substituted without limitation.

The query evaluation layer 230 may be a database application, a database system, or a database service which may execute in conjunction with the example operating system 210. The query evaluation layer 230 may make use of I/O, component object model services, distributed component object model services, world wide web services, or network communication services of the example operating system 210 to receive an instance query 250, execute the query on the database 240, and return the result of the instance query 260. In an alternative example, the query evaluation layer 230 may receive an instance query 250, estimate the results of the query, and return the result of the instance query 260.

The database 240 may be a database application, a database service, or data storage of any type executing in conjunction with the operating system 210. The database 240 may also implement typical data access functionality such that other processes, services, applications, components, or any other system coupled to the database 240 may request the database 240 add, modify, or delete information.

FIG. 3 shows an example processing flow of query generation 220 (see FIG. 2) in accordance with an example implementation of query generation using cardinality constraints 120 (see FIG. 1). The example processing flow of query generation 220 may be described with reference to the features of the execution environment 200 (see FIG. 2), although such implementations are illustrative of examples only, and are not intended to be limiting in any manner.

Block 310 may refer to an operation in which a pattern query, an initial set of parameters for the pattern query, and a desired cardinality for one or more of the clauses of the pattern query are selected. The pattern query, an initial set of parameters for the pattern query, and a desired or acceptable cardinality may have been specified by a user, by any method of analyzing the database, or by any other method producing the pattern query, an initial set of parameters for the pattern query, and a desired cardinality without limitation.

The pattern query may take any form compatible with the database upon which the query will be performed. For example, if the database is a SQL database, the pattern query may be a SQL query.

Selecting a pattern query may be accomplished using any method which produces a pattern query accepting at least one parameter useful in selecting data to be returned from a database. For example, a table in a database may be randomly populated with numerical attributes falling within a certain range, e.g. between 0 and 1. A query may then be constructed such that a parameter selects a variable amount of data from the table.

For example, if the database is a SQL database and a table named $R_1$ within the database includes a column named a which may be populated with attributes 0, 0.1, 0.2, 0.3, 0.4, 0.5, 0.6, 0.7, 0.8, 0.9, and 1, a SQL query including a predicate $p_1$ may be created as follows:

SELECT*from $R_1$ WHERE $p_1 <= R_1 \cdot a$

Such a SQL query may be known as a query including a single-sided predicate. Substituting a parameter for the predicate $p_1$ may then produce an instance of the query which may be executed in the database. For example, if the chosen parameter is 0.5, the instance query may be created as follows:

SELECT*from $R_1$ WHERE $0.5 <= R_1 \cdot a$

Executing the instance query against the database would return a set of results in which each attribute in the column a is greater than or equal to 0.5. In this example, the attributes 0.5, 0.6, 0.7, 0.8, 0.9, and 1 would be returned. As six attributes were returned, the cardinality of the instance query may be six. Therefore, the parameter 0.5 may produce a cardinality of 6. In another example, selecting a parameter of 0 may select all of the attributes of the row a and produce a cardinality of ten.

Further, a pattern query may be constructed for a database table with double-sided predicates as follows:

SELECT*from $R_1$ WHERE $R_1 \cdot a1 >= p1$ AND $R_1 \cdot a1 <= p2$

A pattern query may also specify multiple cardinality constraints. In the example above, a cardinality constraint may be specified for each sub-query of the example pattern query. That is, a cardinality constraint may be imposed such that $a_1 >= p_1$ includes a cardinality constraint of 2 and $a_1 <= p_2$ includes a cardinality constraint of 5. A pattern query may also join together the data in one or more tables and cardinality constraints may be imposed upon the results of joining the tables and selecting data from the joined tables.

The pattern query may take any form and is not limited in the database query language in which it may be implemented, the structure of the query, etc.

The initial set of parameters may be chosen using any method which produces a suitable set of parameters having a cardinality approximately equal to the desired cardinality constraint. For example, two initial parameters may be chosen at random, and the cardinality of each parameter may be evaluated using the method discussed above. The cardinality error of each parameter may then be compared to the cardinality constraint and the parameter with the smallest difference from the cardinality constraint may be selected as the initial parameter.

Block 320 may refer to an operation in which at least one candidate set of parameters may be chosen based on the initial set of parameters selected at block 310. A candidate set of parameters may be generated in conjunction with the initial set of parameters selected at block 310 using any method. For example, one candidate set of parameters may be selected by adding a value to the initial set of parameters and another candidate set of parameters may be selected by subtracting the same value from the initial set of parameters.

Block 330 may refer to an operation in which each set of candidate parameters is substituted into the pattern query which may create an instance query for the current set of candidate parameters. Each instance query may then be evaluated against the query evaluation layer which may then return the cardinality for the current set of candidate parameters. The result of the operation at block 330 may be a set of candidate parameters and the corresponding cardinality of each set of candidate parameters.

Block 340 may refer to an operation in which the cardinality error of each set of candidate parameters is evaluated. The cardinality error may be the difference between the returned cardinality of the parameter and cardinality constraint. The cardinality error may be calculated using a relative comparison of the returned cardinality and the cardinality constraint or an absolute comparison of the returned cardinality and a cardinality constraint.

Further, if more than one cardinality constraint has been specified, the cardinality error may be calculated using an average of the cardinality constraints and an average of the cardinality returned by the candidate parameters. Or, each cardinality constraint may be compared to the cardinality returned by each respective sub-clause in the pattern query. The set of candidate parameters with the smallest cardinality error may be selected for further processing.

Block 350 may refer to an operation in which the cardinality error of the set of candidate parameters selected at block 340 is compared to an allowable or acceptable cardinality that may have been specified in block 310. If the cardinality error of the set of candidate parameters selected at block 340 falls within an allowable limit, flow continues on to block 360. If the cardinality error of the set of candidate parameters selected at block 340 falls outside of an allowable limit, processing flow returns to block 320. When processing flow returns to block 320, a new set of candidate parameters are chosen based on the set of candidate parameters selected at block 340.

Block 360 may refer to an operation in which the candidate set of parameters selected at block 340 have been determined to produce the desired cardinality. The candidate set of parameters selected at block 340 may be used for any database operation in which the desired cardinality may be useful.

FIG. 4 shows an alternative example processing flow of query generation 220 (see FIG. 2) in accordance with an example implementation of query generation using cardinality constraints 120 (see FIG. 1). The example processing flow of query generation 220 may be described with reference to the features of the execution environment 200 (see FIG. 2), although such implementations are illustrative of examples only, and are not intended to be limiting in any manner.

Block 410 may refer to an operation in which an initial set of parameters are selected for a pattern query and an initial step size is selected. A pattern query may be chosen using the same method as used in the discussion of block 310 in FIG. 3.

The initial set of parameters may be chosen using any method which produces a suitable set of parameters having a cardinality approximately equal to the desired cardinality constraint. The step size may be selected using any method that results in producing a step size producing the desired number of iterations. For example, if the range of parameters falls between 0 and 1, a step size of 1 may be selected.

In an alternative example, the step size and the initial set of parameters may be selected using a selectivity constraint in place of absolute cardinality errors or cardinality values. A selectivity constraint may be based upon the relationship between the pattern query without parametric predicates and the cardinality of the pattern query without parametric predicates. For example, a selectivity constraint may be used in conjunction with a pattern query without parametric predicates. The resulting expression may be executed against a database to return a certain number of rows from a database, also known as the cardinality. The selectivity constraint may then be multiplied by a factor and used in conjunction with the pattern query. The resulting expression may be executed against a database to return a number of rows which is equal to the original number of rows multiplied by the factor.

Block 420 may refer to an operation in which a candidate set of parameters are created based upon the step size. Candidate parameters may be created in conjunction with the step size using any type of method or calculation. For example, one set of candidate parameters may be created by adding the step size to the initial parameters and another set of candidate parameters may be created by subtracting the step size from the initial parameters.

If processing flow has arrived at block 420 from block 460 instead of from block 410, a sub-set of parameters determined to have the smallest cardinality error at block 430, block 440, block 450, and block 460 may be used to create a new set of candidate parameters in conjunction with the step size calculated at block 450. The new set of candidate parameters may be created in conjunction with the sub-set of parameters determined to have the smallest cardinality at block 430, block 440, block 450, block 460 and the step size calculated at block 450. For example, one sub-set of candidate parameters may be created by subtracting the step size from the sub-set of parameters determined to have the smallest cardinality error.

Block 430 may refer to an operation in which the cardinality of each sub-set of parameters from the set of candidate parameters created at block 420 is evaluated against the query evaluation layer. The cardinality of each sub-set of parameters from the set of candidate parameters may be evaluated by creating an instance of the pattern query using the sub-set of parameters and executing the query against the database.

Block 440 may refer to an operation in which the cardinality error of the current sub-set of parameters is evaluated. The cardinality error for each current sub-set of parameters may be evaluated using a similar method as discussed with respect to block 330 of FIG. 3.

If the cardinality error of the current sub-set of parameters is not smaller than that of the previous iteration, processing flow continues on to block 450 using the current sub-set of parameters. If the cardinality error of the current sub-set of parameters is smaller than that of the previous iteration, processing flow returns to block 430 and the cardinality error of the next sub-set of parameters is evaluated. Processing may continue until the sub-set of parameters with the smallest cardinality error is identified. If no sub-set of parameters is determined to have the smallest cardinality error, processing may skip to block 450 where a new step size is selected and processing may continue from block 450 with the new step size.

Block 450 may refer to an operation in which the step size is divided by a predetermined factor. For example, the step size may be divided by two. The factor by which the step size is divided may be selected using any method which produces a desired preciseness of cardinality.

In an alternative example, the step size may be modified using a selectivity constraint as discussed earlier.

Block 460 may refer to an operation in which the current step size may be compared to a predetermined value to determine whether or not to continue processing. If the step size is larger than a predetermined value, processing flow returns to block 420 where a new set of parameters is chosen using the newly divided step size. If the step size is smaller than a predetermined value, processing flow may continue on to block 470.

Block 470 may refer to an operation in which the sub-set of parameters chosen at block 440 have been determined to produce the desired cardinality.

Reference has been made throughout this specification to "an example," "alternative examples," "at least one example," "an implementation," or "an example implementation" meaning that a particular described feature, structure, or characteristic is included in at least one implementation of the present invention. Thus, usage of such phrases may refer to more than just one implementation. Furthermore, the described features, structures, or characteristics may be combined in any suitable manner in one or more implementations.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example implementations and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the invention, as both described above and claimed below.

We claim:

1. A method for testing a component of a database application, the method comprising:
   populating, as specified by a user, a column in a database with test data that falls within a certain range specified by the user;
   specifying, by the user, a desired cardinality constraint suitable for testing the component, the component operating on a computing device, wherein the component is a software component;
   specifying, by the user, a parametric pattern query that includes a parameter, wherein the parametric pattern query is compatible with the database, and wherein the parametric pattern query is configured to restrict cardinality when evaluated against the database;
   selecting a candidate value;
   evaluating, by the computing device via the component, the parametric pattern query against the database with the parameter set to the candidate value;
   calculating, by the computing device, a cardinality error as a difference between a returned cardinality and the desired cardinality constraint, wherein the returned cardinality results from the evaluating; and
   adjusting the candidate value based on the calculated cardinality error and then repeating the evaluating the parametric pattern query against the database with the parameter set to the adjusted candidate value and the calculating the cardinality error until the calculated cardinality error is within an allowable limit.

2. The method of claim 1, further comprising:
   selecting a second candidate value;
   evaluating, by the computing device via the component, the parametric pattern query against the database with a second parameter set to the second candidate value, wherein the parametric pattern query further includes the second parameter;
   adjusting, by the computing device, the second candidate value; and
   the repeating the evaluating the parametric pattern query against the database with the parameter set to the adjusted candidate value further comprising the second parameter set to the adjusted second candidate value.

3. The method of claim 2, wherein the parametric pattern query is a SQL query of the form:

SELECT * from T WHERE p # T.c OPERATOR p2 $\#_2$ T.c where T represents a table of the database that includes the column, and where p is the parameter, and where # represents an arithmetic expression, and where T.c represents the column, and where OPERATOR represents a logical operator, and where p2 is the second parameter, and where $\#_2$ represents a second arithmetic expression.

4. The method of claim 1, wherein the parametric pattern query joins at least two tables of the database.

5. The method of claim 1, wherein the parametric pattern query is a SQL query of the form:

SELECT * from T WHERE p # T.c where T represents a table of the database that includes the column, and where p is the parameter, and where # represents an arithmetic expression, and where T.c represents the column.

6. The method of claim 1, wherein the test data comprises numerical values and wherein the certain range is zero to one inclusive.

7. The method of claim 1, wherein the parametric pattern query comprises a plurality of subqueries and wherein a distinct cardinality constraint is specified for each subquery.

8. The method of claim 1, wherein, in response to the cardinality error being within the allowable limit, the parametric pattern query with the parameter set to the candidate value or the adjusted candidate value is utilized to test the component.

9. A system for testing a component of a database application, the system comprising:
   a server configured to populate a column in a database with test data that falls within a certain range specified by a user;
   a query generator configured to specify, as indicated by the user, a desired cardinality constraint suitable for testing the component, the component operating on the system, wherein the component is a software component, wherein the system is a computing device;
   the query generator further configured to specify, as indicated by the user, a parametric pattern query that includes a parameter, wherein the parametric pattern query is compatible with the database, and wherein the parametric pattern query is configured to restrict cardinality when evaluated against the database;
   the query generator further configured to select a candidate value;
   a query evaluation layer configured for evaluating, via the component, the parametric pattern query against the database with the parameter set to the candidate value;
   the query generator further configured for calculating a cardinality error as a difference between a returned cardinality and the desired cardinality constraint wherein the returned cardinality results from the evaluating;
   the query generator further configured to adjust the candidate value based on the calculated cardinality error and further configured to then repeat the evaluating the parametric pattern query against the database with the parameter set to the adjusted candidate value and the calculating the cardinality error until the calculated cardinality error is within an allowable limit.

10. The system of claim 9, wherein the parametric pattern query is a SQL query of the form:

SELECT * from T WHERE p # T.c where T represents a table of the database that includes the column, and where p is the parameter, and where # represents an arithmetic expression, and where T.c represents the column.

11. The system of claim 9, further comprising:
    the query generator further configured to select a second candidate value;
    the query evaluation layer further configured to evaluate, via the component, the parametric pattern query against the database with a second parameter set to the second candidate value, wherein the parametric pattern query further includes the second parameter;
    the query generator further configured to adjust the second candidate value in response to the cardinality error not being within the allowable limit; and
    the query evaluation layer further configured to evaluate, via the component and in response to the cardinality error not being within the allowable limit, the parametric pattern query against the database with the second parameter set to the adjusted second candidate value.

12. The system of claim 11, wherein the parametric pattern query is a SQL query of the form:

SELECT * from T WHERE p # T.c OPERATOR p2
$\#_2$ T.c where T represents a table of the database that includes the column, and where p is the parameter, and where # represents an arithmetic expression, and where T.c represents the column, and where OPERATOR represents a logical operator, and where p2 is the second parameter, and where $\#_2$ represents a second arithmetic expression.

13. The system of claim 9, wherein the test data comprises numerical values and wherein the certain range is zero to one inclusive.

14. The system of claim 9, wherein the parametric pattern query comprises a plurality of subqueries and wherein a distinct cardinality constraint is specified for each subquery.

15. The system of claim 9, wherein, in response to the cardinality error being within the allowable limit, the parametric pattern query with the parameter set to the candidate value or the adjusted candidate value is utilized to test the component.

16. A computer-readable medium storage device comprising computer-executable instructions that, when executed by a processor, cause a computing device to perform a method for testing a component of a database application, the method comprising:

populating, as specified by a user, a column in a database with test data that falls within a certain range specified by the user;

specifying, by the user, a desired cardinality constraint suitable for testing the component, the component operating on a computing device, wherein the component is a software component;

specifying, by the user, a parametric pattern query that includes a parameter, wherein the parametric pattern query is compatible with the database, and wherein the parametric pattern query is configured to restrict cardinality when evaluated against the database;

selecting a candidate value;

evaluating, by the computing device via the component, the parametric pattern query against the database with the parameter set to the candidate value;

calculating, by the computing device, a cardinality error as a difference between a returned cardinality and the desired cardinality constraint wherein the returned cardinality results from the evaluating; and adjusting the candidate value based on the calculated cardinality error and then repeating the evaluating the parametric pattern query against the database with the parameter set to the adjusted candidate value and the calculating the cardinality error until the calculated cardinality error is within an allowable limit.

17. The computer-readable medium of claim 16, wherein the parametric pattern query is a SQL query of the form:

SELECT * from T WHERE p # T.c where T represents a table of the database that includes the column, and where p is the parameter, and where # represents an arithmetic expression, and where T.c represents the column.

18. The computer-readable medium of claim 16, the method further comprising:

selecting a second candidate value;

evaluating, by the computing device via the component, the parametric pattern query against the database with a second parameter set to the second candidate value, wherein the parametric pattern query further includes the second parameter;

adjusting, by the computing device, the second candidate value; and the repeating the evaluating the parametric pattern query against the database with the parameter set to the adjusted candidate value further comprising the second parameter set to the adjusted second candidate value.

19. The computer-readable medium of claim 18, wherein the parametric pattern query is a SQL query of the form:

SELECT * from T WHERE p # T.c OPERATOR p2
$\#_2$ T.c where T represents a table of the database that includes the column, and where p is the parameter, and where # represents an arithmetic expression, and where T.c represents the column, and where OPERATOR represents a logical operator, and where p2 is the second parameter, and where $\#_2$ represents a second arithmetic expression.

20. The computer-readable medium of claim 16, wherein, in response to the cardinality error being within the allowable limit, the parametric pattern query with the parameter set to the candidate value or the adjusted candidate value is utilized to test the component.

* * * * *